(12) United States Patent
Ogino et al.

(10) Patent No.: US 9,898,106 B2
(45) Date of Patent: Feb. 20, 2018

(54) INFORMATION PROCESSING SYSTEM, INFORMATION PROCESSING APPARATUS, AND INFORMATION PROCESSING METHOD

(71) Applicant: TOYOTA JIDOSHA KABUSHIKI KAISHA, Toyota-shi, Aichi-ken (JP)

(72) Inventors: Akira Ogino, Toyota (JP); Ryota Hamabe, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 90 days.

(21) Appl. No.: 14/881,929

(22) Filed: Oct. 13, 2015

(65) Prior Publication Data

US 2016/0162056 A1 Jun. 9, 2016

(30) Foreign Application Priority Data

Dec. 3, 2014 (JP) .................. 2014-245206

(51) Int. Cl.
*G06F 3/0354* (2013.01)
*G01C 21/36* (2006.01)
*B60K 35/00* (2006.01)
*G06F 3/0488* (2013.01)

(52) U.S. Cl.
CPC .......... *G06F 3/03547* (2013.01); *B60K 35/00* (2013.01); *G01C 21/3664* (2013.01); *G06F 3/04883* (2013.01); *G06F 2203/04808* (2013.01)

(58) Field of Classification Search
CPC combination set(s) only.
See application file for complete search history.

(56) References Cited

U.S. PATENT DOCUMENTS

| 5,327,161 A | * | 7/1994 | Logan ............... G06F 3/038 345/157 |
| 2004/0100451 A1 | | 5/2004 | Okada |
| 2007/0247435 A1 | * | 10/2007 | Benko ............... G06F 3/0488 345/173 |
| 2008/0174567 A1 | | 7/2008 | Woolley et al. |
| 2014/0111429 A1 | * | 4/2014 | Layton ............... G06F 3/0416 345/157 |
| 2014/0306897 A1 | | 10/2014 | Cueto |

FOREIGN PATENT DOCUMENTS

| JP | 2002-244809 A | 8/2002 |
| JP | 2004-086735 A | 3/2004 |
| JP | 2004-244809 A | 9/2004 |
| JP | 2013-003718 A | 1/2013 |
| JP | 2013-109603 A | 6/2013 |
| JP | 5307726 B2 | 10/2013 |

* cited by examiner

*Primary Examiner* — Robin Mishler
(74) *Attorney, Agent, or Firm* — Oliff PLC

(57) ABSTRACT

An information processing system includes a touch pad; a display unit; and a processing unit configured to move a cursor shown on a screen of the display unit, depending on an amount of movement and a movement direction of a contact point of a finger of an operator on the touch pad. The processing unit differentiates an amount of movement of the cursor with respect to the amount of the movement of the contact point, for a case where the number of the contact points on the touch pad is one, and for a case where the number of the contact points on the touch pad is two or more.

12 Claims, 10 Drawing Sheets

FIG.7A
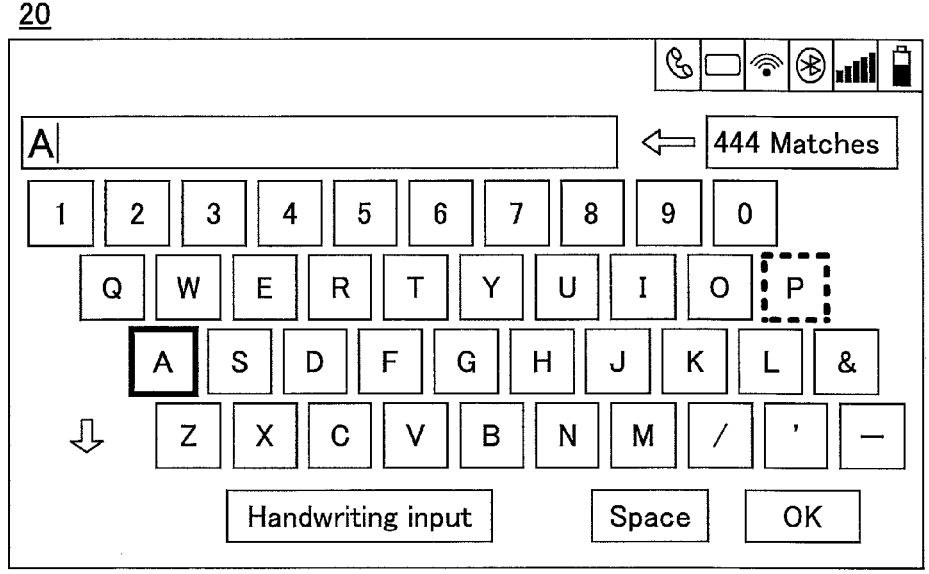
FIG.7B
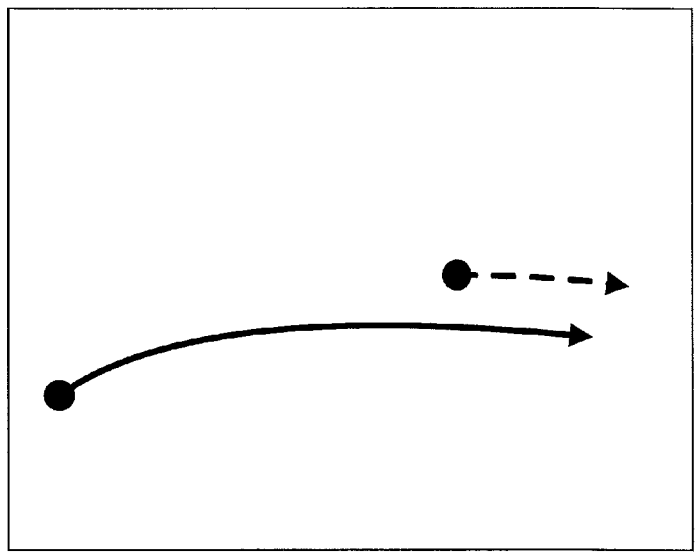
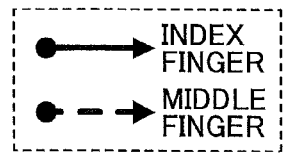

| AREA | Aa | Ab | Ac | Ad |
|---|---|---|---|---|
| 2ND SETTING VALUE (CD RATIO) | Vab | | Vcd | |

| AREA | Aa | Ad | Ab | Ac |
|---|---|---|---|---|
| 2ND SETTING VALUE (CD RATIO) | Vad | | Vbc | |

| AREA | Aa | Ab | Ac | Ad |
|---|---|---|---|---|
| 2ND SETTING VALUE (CD RATIO) | Va | Vb | Vc | Vd |

| DISTANCE BETWEEN TWO POINTS D | D>L1 | L2<D≦L1 | L3<D≦L2 | D≦L3 |
|---|---|---|---|---|
| 2ND SETTING VALUE (CD RATIO) | V1 | V2 | V3 | V4 |

INFORMATION PROCESSING SYSTEM, INFORMATION PROCESSING APPARATUS, AND INFORMATION PROCESSING METHOD

FIELD

The disclosures herein generally relate to an information processing system and the like that execute a process to move a cursor on a screen, depending on movement of a contact point(s) on a touch pad.

BACKGROUND

Conventionally, a technology has been known that changes, when moving a cursor on a screen by using a touch pad, a CD ratio (Control-Display Ratio: a ratio of an amount of movement of a cursor on a screen, to an amount of movement of a contact point (a finger of an operator) on the operational surface of the touch pad) (see, for example, Patent Document 1).

In Patent Document 1, a switching touch panel is disposed around the touch pad, to change the CD ratio. Therefore, by operating the switching touch panel, the CD ratio can be set comparatively greater, or comparatively smaller. Namely, during a slide operation where a finger is moved while contacting the touch pad, it is comparatively easy to perform a series of operations such that the cursor is moved quickly with a comparatively greater CD ratio, and then, the CD ratio is switched to a comparatively smaller value, to have the cursor positioned and stopped on an operational object (an icon or the like).

RELATED-ART DOCUMENTS

Patent Documents

[Patent Document 1] Japanese Laid-open Patent Publication No. 2004-244809

However, according to the technology in Patent Document 1, since the switching touch panel is fixed, a situation may arise where the CD ratio is difficult to change during a slide operation, depending on a position of the finger on the touch pad even if multiple switching touch panels are provided.

Thereupon, in view of the above, it is an object of at least one embodiment of the present invention to provide an information processing system and the like that make it possible for a user to switch the CD ratio easily when moving a cursor on a screen by using a touch pad, without depending on the position of a finger on the touch pad.

SUMMARY

According to an embodiment of the present invention, an information processing system or the like includes a touch pad; a display unit; and a processing unit configured to move a cursor shown on a screen of the display unit, depending on an amount of movement and a movement direction of a contact point of a finger of an operator on the touch pad. The processing unit differentiates an amount of movement of the cursor with respect to the amount of the movement of the contact point, for a case where the number of the contact points on the touch pad is one, and for a case where the number of the contact points on the touch pad is two or more.

Also, according to another embodiment of the present invention, an information processing method includes a processing step to move a cursor shown on a screen, depending on an amount of movement and a movement direction of a contact point of a finger of an operator on the touch pad. In the processing step, an amount of movement of the cursor with respect to the amount of the movement of the contact point is differentiated, for a case where the number of the contact points on the touch pad is one, and for a case where the number of the contact points on the touch pad is two or more.

According to at least one embodiment of the present invention, it is possible to provide an information processing system and the like that make it possible for a user to switch the CD ratio easily when moving a cursor on a screen by using a touch pad, without depending on the position of a finger on the touch pad.

BRIEF DESCRIPTION OF DRAWINGS

FIGS. 7A-7B are diagrams that illustrate operations of an information processing system according to the first embodiment;

DESCRIPTION OF EMBODIMENTS

In the following, embodiments of the present invention will be described with reference to the drawings.

First Embodiment

Figure 1:
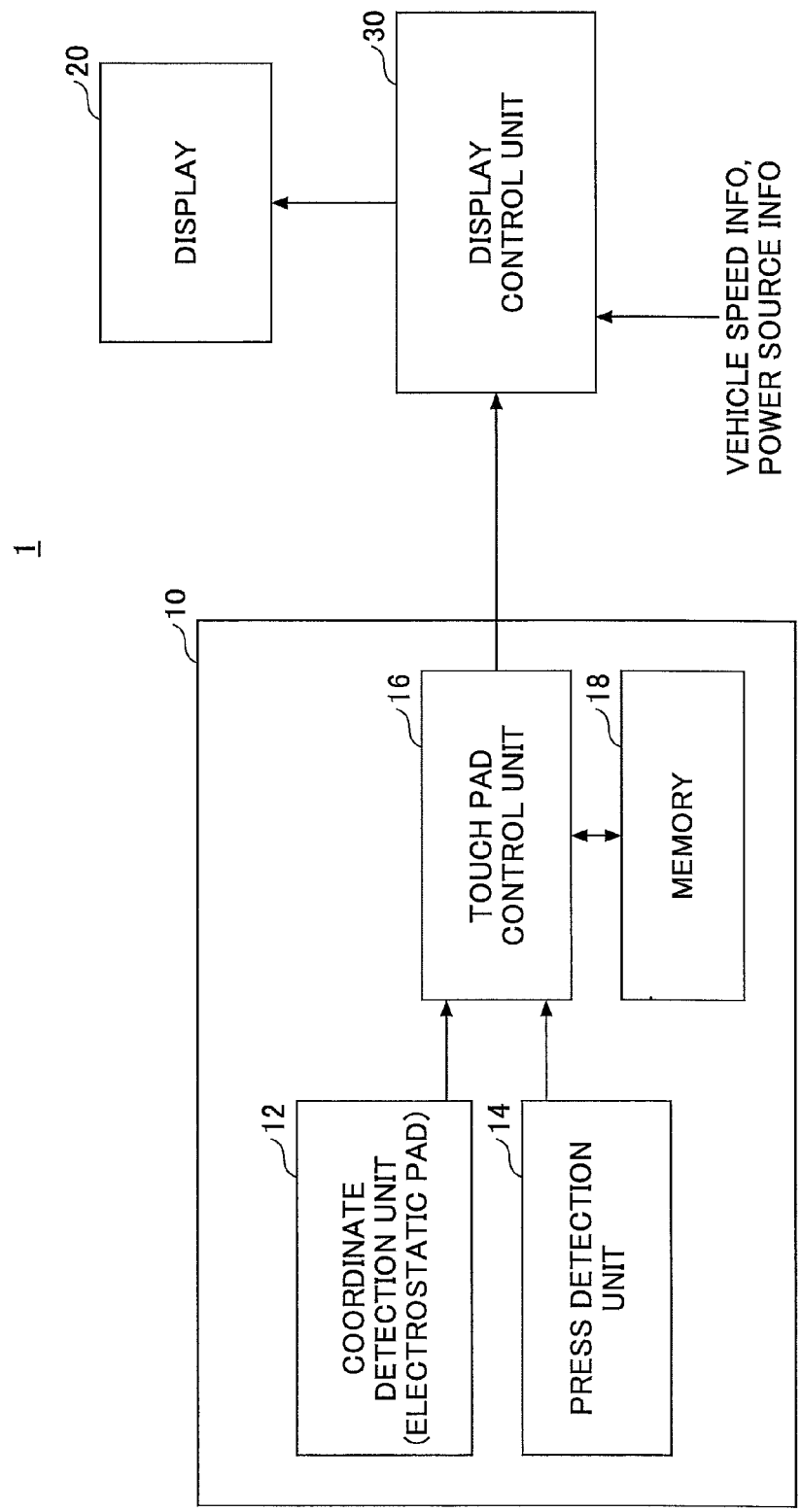
FIG. 1 is a block diagram that illustrates an example of a configuration of an information processing system.

FIG. 1 is a block diagram that illustrates an example of a configuration of an information processing system 1 according to the present embodiment. The information processing system 1 includes a touch pad 10, a display 20, and a display control unit 30, executes a process to have the display 20 show an operational screen on which an operation can be made with the touch pad 10, and executes various processes accompanying operations by a user on the operational screen with the touch pad 10. In the following, it is assumed that the information processing system 1 is installed in a vehicle.

Figure 2:
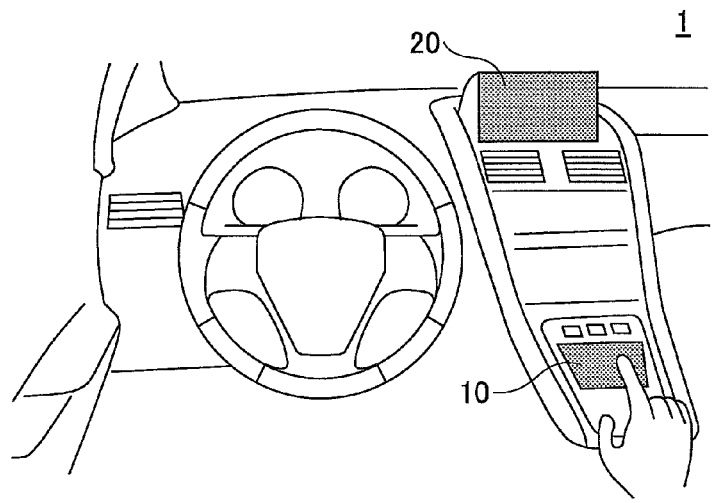
FIG. 2 is a diagram that illustrates an example of an aspect of placement of a touch pad and a display.

The touch pad 10 is an operational unit to operate a screen (operational screen) shown on the display 20. The touch pad 10 is disposed at an appropriate place in the vehicle compartment, and may preferably be placed at a position that is easy for the driver to operate (a position reachable by a hand while keeping a driving posture). For example, as illustrated in FIG. 2 (a diagram that illustrates an example of an aspect of placement of the touch pad 10 and the display 20), the touch pad 10 may be placed at the console box or around it. As illustrated in FIG. 1, the touch pad 10 includes a coordinate detection unit 12, a press detection unit 14, a touch pad control unit 16, and a memory 18.

Here, the touch pad 10 will be described in detail by further using FIG. 3 and FIG. 4.

Figure 3:
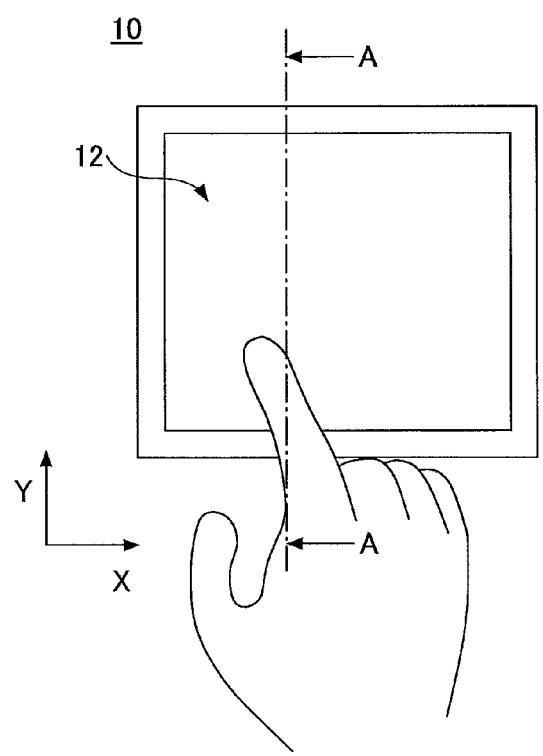
FIG. 3 is a plan view that basically illustrates a touch pad.
Figure 4:
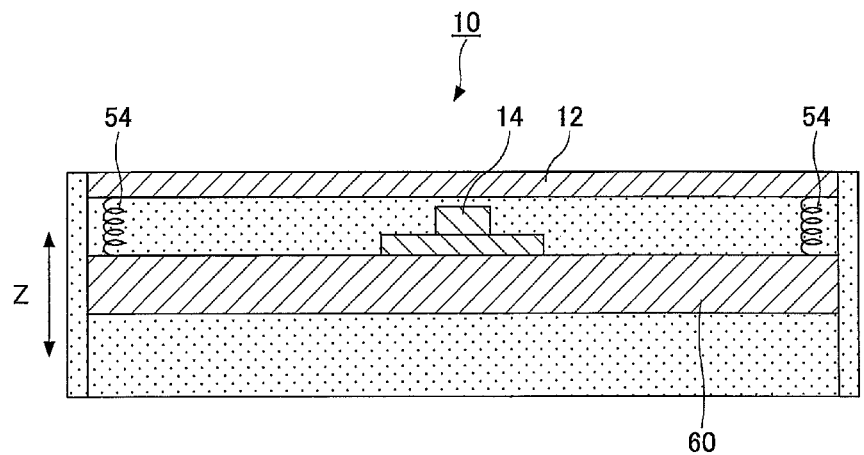
FIG. 4 is a cross-sectional view that basically illustrates a cross section of a core part of a touch pad.

FIG. 3 is a plan view that basically illustrates the touch pad 10. FIG. 4 is a cross-sectional view that basically illustrates a cross section of a core part of the touch pad 10, specifically, a cross-sectional view taken along the line A-A of FIG. 3.

As illustrated in FIG. 3, the coordinate detection unit 12 is a unit that includes an operational surface (touch operational surface) of the touch pad 10 that is two-dimensional and virtually flat, to detect a coordinate position of a finger of an operator (simply referred to as an "operational finger", below) contacting the touch operational surface, namely, a coordinate position of a contact point on the touch operational surface. The coordinate detection unit 12 includes, for example, an electrostatic sensor, and its detection signal is output to the touch pad control unit 16. The coordinate detection unit 12 may be configured with, for example, an electrostatic pad. In this case, the electrostatic pad may have a structure in which, for example, electrodes (electrostatic sensors) extend linearly in the X-direction and the Y-direction, respectively, on a plane having insulators sandwiched. Detection signals of these electrodes (signals that correspond to the amounts of changes of electric charge accumulated in the electrodes) may be output to the touch pad control unit 16.

Note that the detection signals output from the coordinate detection unit 12 have a resolution with which the touch pad control unit 16, which will be described later, can detect simultaneous contacts by multiple operational fingers on the touch operational surface.

Also, the coordinate detection unit 12 is configured to be movable in the vertical direction with respect to the touch operational surface (the Z direction in FIG. 4, which will be simply referred to as the "vertical direction", below). Namely, the coordinate detection unit 12 (the operational surface of the touch pad 10) is configured so that it can be pressed, and after the press, can recover to the original position. An arbitrary unit (mechanism) may be adopted to make the coordinate detection unit 12 movable in the vertical direction. In the example illustrated in FIG. 4, the coordinate detection unit 12 is supported by a substrate 60 via elastic parts 54, to be movable in the vertical direction. Note that a movement stroke in the vertical direction of the coordinate detection unit 12 may be set arbitrarily, which may be very short, as long as the movement of the coordinate detection unit 12 can be detected by the press detection unit 14, which will be described later.

Note that, in the following, the direction in which the coordinate detection unit 12 is pressed down will be referred to as the "vertically down direction", and the direction recovering to the original position will be referred to as the "vertically up direction".

The press detection unit 14 is a unit to detect movement of the coordinate detection unit 12 (operational surface of the touch pad 10) in the vertically down direction, namely, a pressing operation by an operator on the operational surface of the touch pad 10. The press detection unit 14 outputs a signal that represents movement of the coordinate detection unit 12 in the vertically down direction, to the touch pad control unit 16. The press detection unit 14 may be configured with, for example, a tact switch or a pressure-sensitive sensor (a piezo electric device or the like). The press detection unit 14 may be placed at an arbitrary place as long as it is a location that contacts the coordinate detection unit 12 when the coordinate detection unit 12 is moved in the vertically down direction. In the example illustrated in FIG. 4, a tact switch or a pressure-sensitive sensor that constitutes the press detection unit 14 is disposed at a center portion of the coordinate detection unit 12 in the vertically down direction. Also, tact switches or pressure-sensitive sensors that constitute the press detection unit 14 may be placed at multiple locations separated from each other.

Note that, instead of the press detection unit 14, another unit may be provided to execute a determination operation which will be described later (for example, a button switch that is provided adjacent to the operational surface (the coordinate detection unit 12) of the touch pad 10). In this case, the operational surface (the coordinate detection unit 12) of the touch pad 10 does not need to be movable in the vertical direction, but may be fixed.

The touch pad control unit 16 detects a contact of an operational finger on the touch operational surface, based on an output signal from the coordinate detection unit 12. At this moment, the touch pad control unit 16 generates a coordinate signal that represents a coordinate position on the touch operational surface, namely, a coordinate signal that represents a coordinate position at which the operator performs a touch operation (a coordinate position of a contact point on the touch operational surface). The generated coordinate signal is output to the display control unit 30. If multiple operational fingers contact simultaneously the touch operational surface, the touch pad control unit 16 similarly detects multiple contact points that correspond to the multiple operational fingers based on output signals from the coordinate detection unit 12, generates coordinate signals that represent coordinate positions of the multiple contact points, and outputs the signals to the display control unit 30.

Note that if the coordinate detection unit 12 is configured with an electrostatic pad, electric charge is accumulated in a capacitor formed by an electrode and an operational finger, and the amounts of change of the electric charge at respective electrodes may be different from each other, depending on the positions of the operational fingers. Therefore, the touch pad control unit 16 can identify the coordinate positions of the operational fingers (the coordinate positions of the contact points) based on the detection signals from the respective electrodes.

Also, the touch pad control unit 16 generates a determination signal that represents a determination operation by an operator, based on an output signal from the press detection unit 14. For example, if the press detection unit 14 is formed with a pressure-sensitive sensor, when the output from the pressure-sensitive sensor (press pressure) exceeds a predetermined threshold, the touch pad control unit 16 may detect it as a determination operation by the operator to generate a determination signal. Also, if pressure-sensitive sensors are placed at multiple dispersed locations, the touch pad control unit 16 may generate a determination signal when the output from any one of the pressure-sensitive sensors exceeds the predetermined threshold. Also, if the press detection unit 14 is formed with a tact switch, the touch pad control unit 16 may generate a determination signal when an on signal is input from the tact switch. Also, if tact switches are placed at multiple dispersed locations, the touch pad control unit 16 may generate a determination signal when an on signal is input from any one of the tact switches. The generated determination signal is output to the display control unit 30.

Note that the touch pad control unit 16 and the memory 18 may be configured with, for example, a microcomputer with which various programs stored in the memory 18 may be executed on a CPU.

Referring to FIG. 1 again, the display 20 is a display unit that is placed at a remote position from the touch pad 10, to display a screen (operational screen) that can be operated with the touch pad 10. The display 20 may be placed at an appropriate position in the vehicle compartment, namely, at a position where an operator (driver) can visually recognize it easily. For example, as illustrated in FIG. 2 (diagram that illustrates an example of an aspect of placement of the touch pad 10 and the display 20), the display 20 may be placed on the instrument panel. Also, the display 20 may be a display unit that shows an operational screen directly in the field of vision of an operator, such as an HUD (head-up display). On the display 20, an operational screen is shown that represents operational contents that can be operated with the touch pad 10. Note that as the background of the operational screen, the display 20 may show a TV program, images of a peripheral monitor camera, or the like. Also, the display 20 may show a TV program, images taken by a peripheral monitor camera, or the like when not showing an operational screen.

Figure 5:
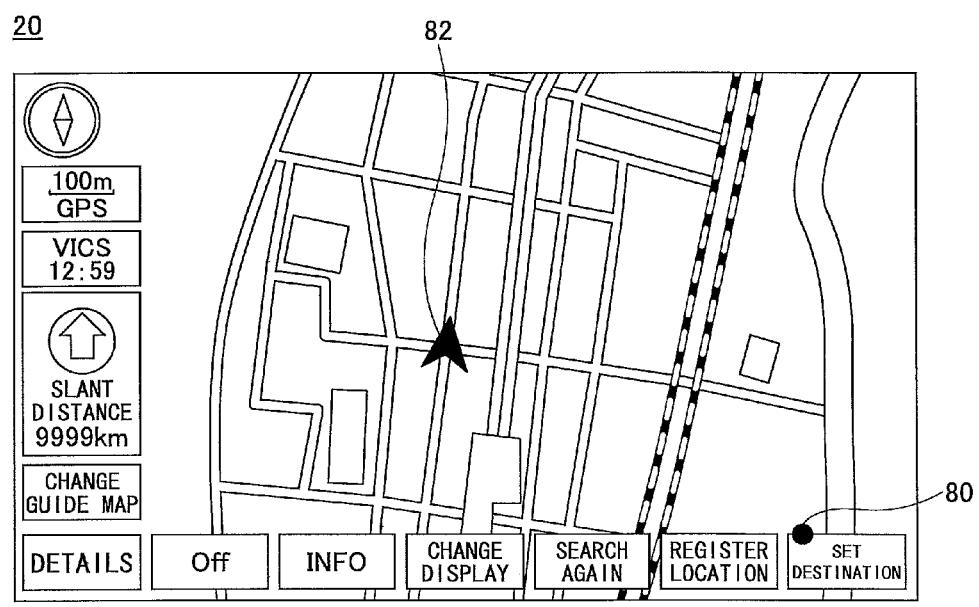
FIG. 5 is a diagram that illustrates an example of a screen (operational screen) shown on a display.

Here, the operational screen shown on the display 20 will be described using FIG. 5. FIG. 5 is a diagram that illustrates an example of a screen (operational screen) shown on the display 20. Specifically, it represents a map screen of a navigation apparatus. Note that an operational screen may be shown on the whole display area of the display 20 as illustrated in this figure, or may be shown on a part of the display area. Also, in the following, notations about directions, "up", "down", "left", and "right" designate up, down, left, and right directions, respectively, on the screen of the display 20.

Referring to FIG. 5, a map screen is shown on the whole display area of the display 20, and an arrow 82 that indicates the current position of the vehicle is shown around the center of the map screen. Points on a map on the map screen are configured to be selectable by an operator by moving a cursor 80 via the touch pad 10. For example, by moving the cursor 80 to a desired position on the map, the operator can select a departure location and/or a destination location on the navigation apparatus, and can select a position of a facility of which he/she wants to show detailed information. In such a case, by performing a determination operation at a desired position on the map via the touch pad 10, the operator can determine a departure location and/or a destination location on the navigation apparatus, and can determine a facility of which he/she wants to show the detailed information. Also, the map shown on the display 20 can be scrolled by an operation on the touch pad 10 (map scrolling).

Also, icons (virtual buttons) are shown along the left end part and the lower end part of the screen of the display 20 that show selection items representing operational objects. For example, as illustrated in FIG. 5, the operator may perform a determination operation in a state where the cursor 80 has been moved on an icon of "set destination" (selection operation), to transition to a screen for setting a destination location on the navigation apparatus. Note that, on the screen for setting a destination location, the operator may set a destination location based on a history of destination locations that have been set in the past, a registered location list that has been registered in advance, a search result of telephone numbers, addresses, any keywords, and the like. Also, in the following, each point on the map on the map screen is assumed to be one of selection items representing operational objects.

In this way, multiple selection items (operational objects) are shown on the operational screen, and when the operator moves the cursor on one of the selection items via the touch pad 10 (selection operation), and then, performs a determination operation, operational contents of the selection item are executed. Also, the selection items shown on the operational screen may include a group of selection items (lists and/or maps) that can be scrolled by an operation by the operator on the touch pad 10. Note that a selection item may be provided for an arbitrary function. Namely, operational contents that can be operated on the touch pad 10 can be arbitrarily set. For example, the selection items may include a selection item for various settings of an air conditioner, a selection item to show the setting screen on the display 20, and the like. Also, the selection items may include a selection item to select a sound source of an audio apparatus (a CD/DVD, an optical disk, a hard disk, a radio, etc.), a selection item to select a sound object (a tune, an album, etc.) included in the sound source, and the like.

The display control unit 30 is a control unit to control the screen shown on the display 20, and assists an operation on the touch pad 10 by synchronizing the display 20 with the touch pad 10. More specifically, the display control unit 30 shows an operational screen on the display 20, and based on a signal (a coordinate signal or a determination signal) from the touch pad 10, executes a selection process, a determination process, and the like for the various selection items. For example, suppose that the operator performs an operation having his/her finger contact the operational surface of the touch pad 10, and slides the finger on it (selection operation). In response to the operation, the display control unit 30 moves the cursor on the operational screen, and transitions to a state where one of the selection items is selected. Namely, a selection function is implemented in response to a selection operation performed by the operator (selection process).

Note that if the cursor is positioned in a region on the screen of the display 20 where no selection items exist, the display control unit 30 may be in a state where no selection item is selected, or may be in a state where a selection item is selected that has been associated with the region in advance. Also, the cursor described in the following includes a pointer.

Here, a relative coordinate mode will be described, which is an aspect of synchronization between the position and movement of a contact point on an operational surface of the touch pad 10, and the position and movement of the cursor on the screen of the display 20. The relative coordinate mode is a mode in which the coordinate system of the screen of the display 20 synchronizes with the coordinate system of the operational surface of the touch pad 10, in an aspect of relative synchronization. In the relative coordinate mode, the coordinate system of the screen of the display 20 is associated with the coordinate system of the operational surface of the touch pad 10, in an aspect where the origin of the coordinate system on the display 20 is typically positioned at a current position of the cursor, and the origin of the coordinate system of the operational surface of the touch pad 10 is positioned at a current contact position of an operational finger on the operational surface. For example, if the operator has a finger contact the operational surface of the touch pad 10, and slides the operational finger downward, the cursor on the screen of the display 20 moves downward from a display position on the screen. In this case, the amount of movement of the cursor on the screen of the display 20 is determined depending on the distance (the amount of movement) by which the operational finger has been slid on the operational surface. Namely, the display control unit 30 moves the cursor on the screen of the display 20 depending on the amount of the movement and the movement direction on the operational surface of the touch pad 10. In this case, the display control unit 30 sets (changes) the CD ratio (Control-Display Ratio: the ratio of the amount of movement of the cursor on the screen of the display 20, to the amount of movement on (the operational surface of) the touch pad 10), following a predetermined condition. Then, depending on the set CD ratio, the display control unit 30 moves the cursor on the screen of the display 20. A process (CD ratio change process) to set (change) the CD ratio executed by the display control unit 30 will be described later in detail.

Also, if the operator performs a pressing operation on the touch pad 10 in a state where one of the selection items is selected (determination operation), the display control unit 30 implements the operational contents of the selected selection item. Namely, in response to a determination operation, the display control unit 30 implements a determination function (determination process). Operational contents depend on the selection items, and may include displaying lower level selection items; transitioning to a screen, such as changing an operational screen; inputting characters; activating an application; transmitting a control signal to an apparatus to be operated (for example, an air conditioner); and the like.

Note that the display control unit 30 may be configured with, for example, a microcomputer to execute various control processes by running various programs stored in a ROM on a CPU. Also, a part of or all of the functions of the display control unit 30 may be implemented by the touch pad control unit 16 in the touch pad 10, or another control unit in the display 20 (not illustrated). Also, a part of or all of the functions of the touch pad control unit 16 in the touch pad 10 may be implemented by the display control unit 30. Also, if necessary, the display control unit 30 may receive as input vehicle speed information that represents the vehicle speed, and power source information that relates to a state (IG and ACC) of the power source of the vehicle.

In this way, according to the touch pad 10 in the present embodiment, the operator can select a desired selection item, while watching the display 20, by touching the operational surface of the touch pad 10 by a finger (for example, the index finger), and moving (sliding) the finger on the operational surface to perform a selection operation. Also, the operator can perform a determination operation in a state where a desired selection item is selected, by pressing the operational surface of the touch pad 10 (the coordinate detection unit 12).

Next, a CD ratio change process will be described that is executed by the information processing system 1 according to the present embodiment.

Figure 6:
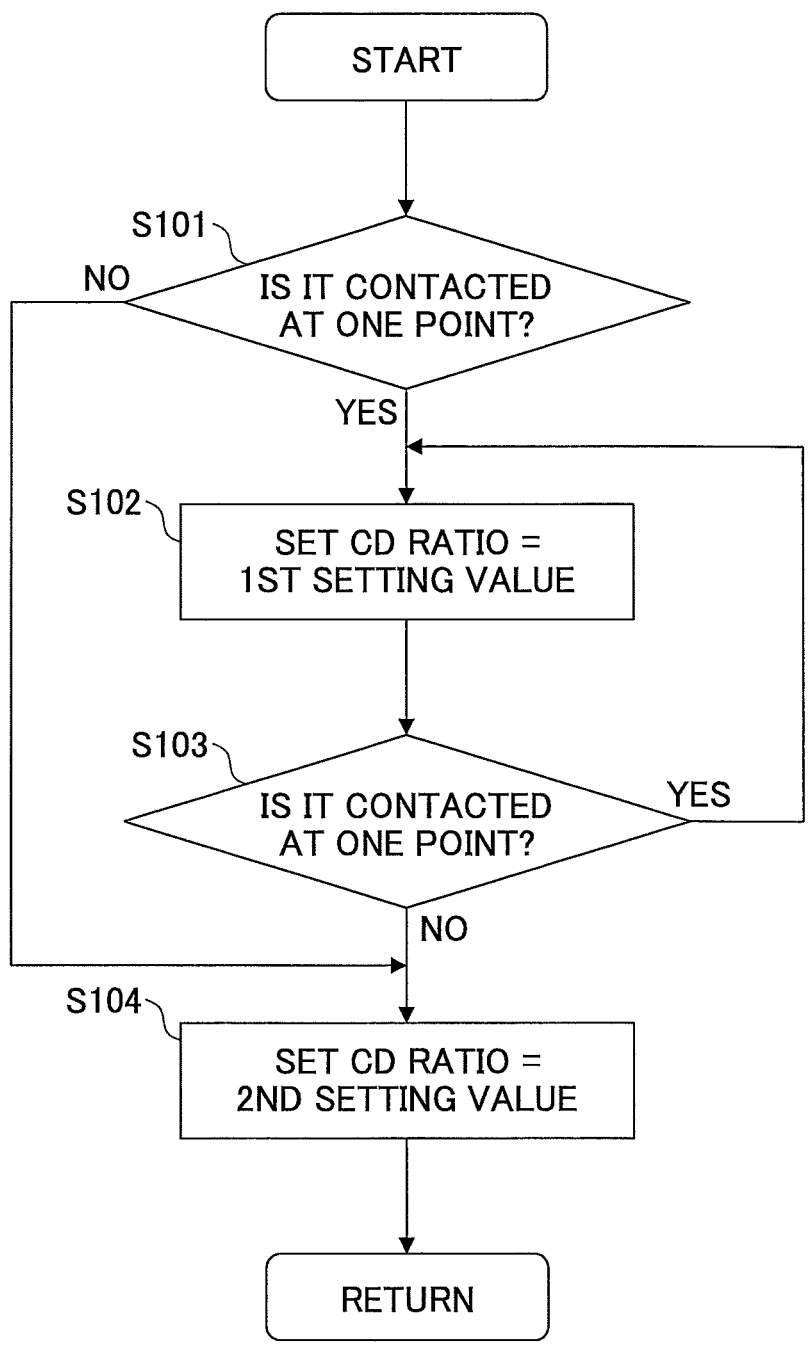
FIG. 6 is a flowchart that illustrates an example of a CD ratio switching process by an information processing system (a display control unit) according to a first embodiment.

FIG. 6 is a flowchart that illustrates an example of a CD ratio switching process executed by the information processing system 1 (the display control unit 30) according to the present embodiment. The process is executed every time a contact point (an operational finger) is detected on the operational surface of the touch pad 10, and while the detection of the contact point continues (while the slide operation by the operator continues), Steps S101 to S104 are repeated as will be described later. Also, if no contact point is detected on the operational surface of the touch pad 10 while executing the process, the process ends.

At Step S101, the display control unit 30 determines whether there is only one contact point. If determining that there is only one contact point, the display control unit 30 goes forward to Step S102; if the number of contact points is not one (there are two or more), the display control unit 30 goes forward to Step S104.

At Step S102, the display control unit 30 sets a first setting value to the CD ratio. Then, depending on the CD ratio set to the first setting value, the display control unit 30 moves the cursor on the screen of the display 20.

Note that the first setting value corresponds to, for example, a CD ratio with which the cursor can be moved on the screen of the display 20 from the left end to the right end when a slide operation is performed from the left end to the right end on the operational surface of the touch pad 10. Also, if being in a state where the CD ratio has already been set to the first setting value, the CD ratio does not need to be reset. In this case, Step S102 means that the state is maintained where the CD ratio is the first setting value.

At Step S103, the display control unit 30 determines whether there is only one contact point, namely, whether the state continues where there is only one contact point. If there is only one contact point, the display control unit 30 goes back to Step S102 to maintain the state where the CD ratio is the first setting value; if there are two or more contact points, the display control unit 30 goes forward to Step S104.

At Step S104, the display control unit 30 sets a second setting value to the CD ratio. For example, if being in a state where the CD ratio has been set to the first setting value, the display control unit 30 changes the CD ratio from the first setting value to the second setting value. Then, depending on the CD ratio set to the second setting value, the display control unit 30 moves the cursor on the screen of the display 20.

Note that the second setting value is less than the first setting value described above, and corresponds to, for example, a CD ratio with which the operator can move the cursor to be positioned comparatively easily on one of the selection items on the operational screen shown on the display 20. Also, the second setting value may be set to an optimum value depending on the number, size and interval of the selection items on the operational screen shown on the display 20. Also, if being in a state where the CD ratio has already been set to the second setting value, the CD ratio does not need to be reset. In this case, Step S104 means that the state is maintained where the CD ratio is the second setting value.

In this way, the information processing system 1 (the display control unit 30) according to the present embodiment differentiates the CD ratio, for a case where there is only one contact point on the operational surface of the touch pad 10, and for a case where there are two or more.

Specifically, if there is only one contact point (a slide operation is performed with only one operational finger), the CD ratio is set comparatively greater (=the first setting value); or if there are two or more contact points (a slide operation is performed with two or more operational fingers), the CD ratio is set comparatively less (=the second setting value).

Next, using FIGS. 7A-7B, a situation will be described where the CD ratio switching process by the information processing system 1 (the display control unit 30) illustrated in FIG. 6, functions effectively.

FIGS. 7A-7B are diagrams that illustrate operations of the information processing system 1 according to the present embodiment. FIG. 7A illustrates a character input screen as an example of an operational screen (a screen used when searching for a destination location with a keyword on the navigation apparatus) that specifically shows a keyboard including alphanumeric keys. FIG. 7B is a diagram that illustrates an example of a slide operation on the operational screen illustrated in FIG. 7A where a letter "A" (simply referred to as "A", below) has been input as a character, and then, a letter "P" (simply referred to as "P", below) is to be input as another character.

Assume that the operator operates the operational surface of the touch pad 10 by the right hand.

As illustrated in FIG. 7A, "A" is positioned at the left end part on the screen of the display 20, and "P" is positioned at the right end part on the screen of the display 20. Namely, after having "A" input as a character, to input "P" as a character, the operator needs to move the cursor 80 from the left end part to the right end part on the screen. Therefore, to move the cursor 80 by a single slide operation on the operational surface of the touch pad 10, it is desirable that the CD ratio is set to a comparatively greater value.

On the other hand, as illustrated in FIG. 7A, a region allocated to one letter or the like on the keyboard on the character input screen (a region allocated to one selection item) is very small, and the interval is narrow. Therefore, to position the cursor 80 on "P" by a single slide operation on the operational surface of the touch pad 10, it is desirable that the CD ratio is set to a comparatively smaller value.

Thereupon, as illustrated in FIG. 7B, the operator starts performing a slide operation by the index finger from the left end part to the right end part on the operational surface of the touch pad 10. Then, at a timing when the cursor 80 gets closer to a certain extent to the right end on the operational surface of the touch pad 10, the operator has the middle finger contact the operational surface of the touch pad 10, and continues the slide operation by the two fingers, namely, the index finger and the middle finger. This makes it possible to quickly move the cursor 80 from "A" to "P", and to correctly position the cursor 80 on "P". Thus, operability can be improved when the cursor is moved.

Namely, when the slide operation is started with one finger or the index finger (there is only one contact point), the CD ratio is set to the first setting value, which is comparatively greater. Therefore, the amount of movement of the cursor 80 is comparatively greater with respect to the amount of movement of the operational finger on the operational surface of the touch pad 10, and it is possible to quickly move the cursor 80 from "A" to the neighborhood of "P". On the other hand, when the slide operation is shifted to a two-finger operation by the index finger and the middle finger, the CD ratio is changed to the second setting value, which is comparatively less. Therefore, the amount of movement of the cursor 80 is comparatively smaller with respect to the amount of movement of the operational fingers on the operational surface of the touch pad 10, and it is possible position the cursor 80 on "P" by the single slide operation.

In this way, by the information processing system 1 according to the present embodiment, the operator can easily change the CD ratio, by changing the number of fingers to contact the operational surface of the touch pad 10 during a slide operation, without depending on the position of a finger on the operational surface of the touch pad 10. Also, the operator can easily change the CD ratio, by changing the number of fingers to contact the operational surface of the touch pad 10 during a slide operation, without stopping the slide operation.

Note that although the CD ratio is changed to be comparatively less if the contact points increase on the operational surface of the touch pad 10 (for example, from one to two) in the present embodiment, it may be the other way around. Namely, the CD ratio is changed to be comparatively less if the contact points decrease on the operational surface of the touch pad 10 (for example, from two to one). In this case, the operator performs a slide operation by having two fingers contact on the operational surface of the touch pad 10, and then, changes the number of contacting fingers to one, and continues the slide operation. This operation also makes it possible to quickly move the cursor 80, and to correctly position the cursor 80 at a desired position.

Second Embodiment

Next, a second embodiment will be described.

An information processing system 1 according to the present embodiment differs from that in the first embodiment in that the CD ratio is differentiated for a case where the number of contact points on the operational surface of the touch pad 10 is two, and for a case where the number is greater than two. In the following, the same elements as in the first embodiment are assigned the same numerical codes, and different parts will be mainly described.

Note that a configuration of the information processing system 1 according to the present embodiment can be represented by FIG. 1 as in the first embodiment, and its description is omitted.

Figure 8:
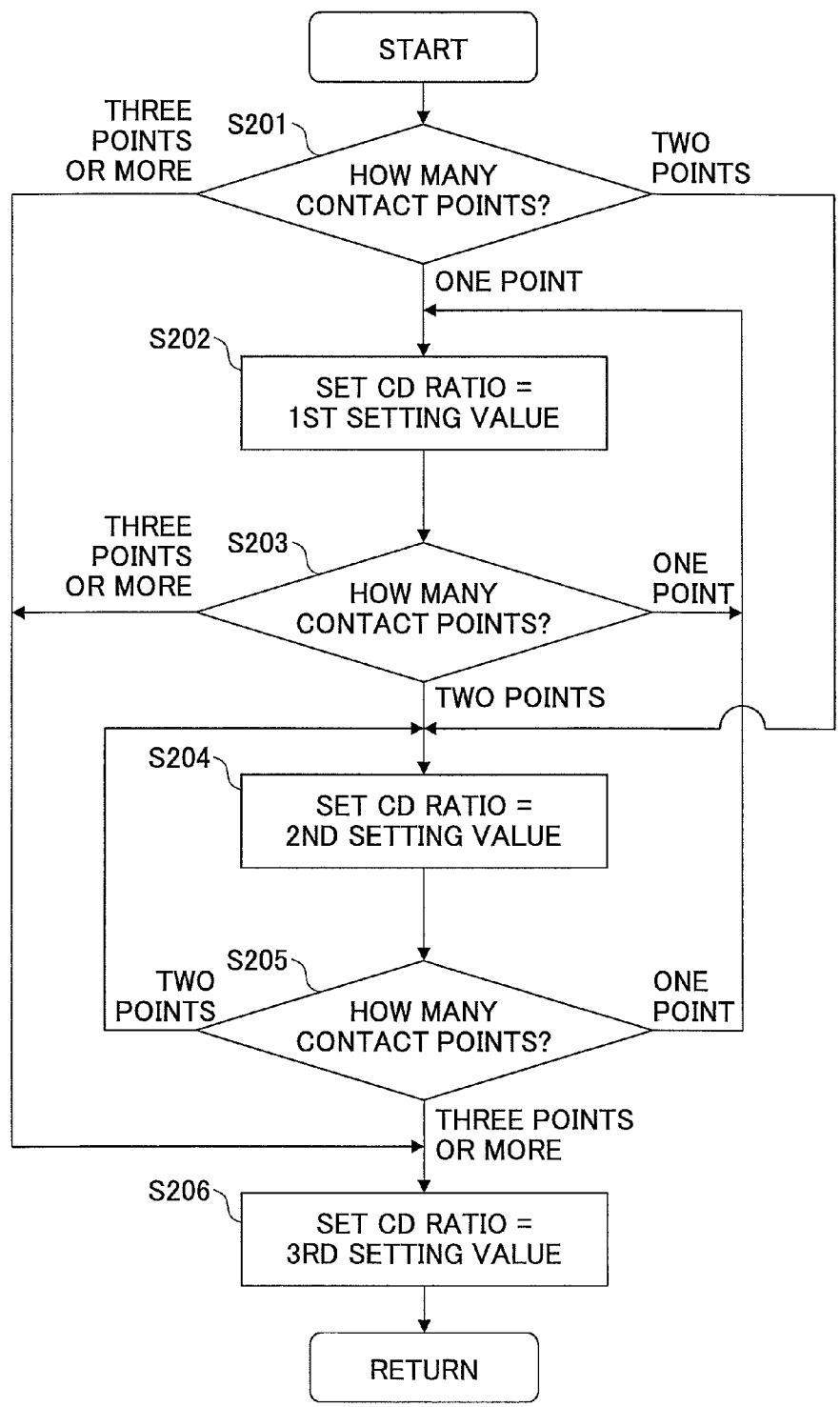
FIG. 8 is a flowchart that illustrates an example of a CD ratio switching process by an information processing system (display control unit) according to a second embodiment.

FIG. 8 is a flowchart that illustrates an example of a CD ratio switching process by the information processing system 1 (the display control unit 30) according to the present embodiment. The process is executed every time a contact point (an operational finger) is detected on the operational surface of the touch pad 10, and while the detection of the contact point continues (while the slide operation by the operator continues), Steps S201 to S206 are repeated as will be described later. Also, if no contact point is detected on the operational surface of the touch pad 10 while executing the process, the process ends.

At Step S201, the display control unit 30 determines how many contact points there are. If determining that there is only one contact point, the display control unit 30 goes forward to Step S202; if there are two contact points, the display control unit 30 goes forward to Step S204; or if there are three or more contact points, the display control unit 30 goes forward to Step S206.

At Step S202, the display control unit 30 sets a first setting value to the CD ratio. Then, depending on the CD ratio set to the first setting value, the display control unit 30 moves the cursor on the screen of the display 20.

Note that, similarly to the first embodiment, the first setting value corresponds to, for example, a CD ratio with which the cursor can be moved on the screen of the display 20 from the left end to the right end when a slide operation is performed from the left end to the right end on the operational surface of the touch pad 10. Also, if being in a state where the CD ratio has already been set to the first setting value, the CD ratio does not need to be reset. In this case, Step S202 means that the state is maintained where the CD ratio is the first setting value.

At Step S203, the display control unit 30 determines how many contact points there are. If there is only one contact point, the display control unit 30 goes back to Step S202 to maintain the state where the CD ratio is the first setting value; if there are two contact points, the display control unit 30 goes forward to Step S204; or if there are three or more contact points, the display control unit 30 goes forward to Step S206.

At Step S204, the display control unit 30 sets a second setting value to the CD ratio. For example, if being in a state where the CD ratio has been set to the first setting value, the display control unit 30 changes the CD ratio from the first setting value to the second setting value. Then, depending on the CD ratio set to the second setting value, the display control unit 30 moves the cursor on the screen of the display 20.

Note that, similarly to the first embodiment, the second setting value is less than the first setting value described above, and corresponds to, for example, a CD ratio with which the operator can move the cursor to be positioned comparatively easily on one of the selection items on the operational screen shown on the display 20. Also, the second setting value may be set to an optimum value depending on the number, size and interval of the selection items on the operational screen shown on the display 20. Also, if being in a state where the CD ratio has already been set to the second setting value, the CD ratio does not need to be reset. In this case, Step S204 means that the state is maintained where the CD ratio is the second setting value.

At Step S205, the display control unit 30 determines how many contact points there are. If there is only one contact point, the display control unit 30 goes back to Step S202; if there are two contact points, the display control unit 30 goes back to Step S204 to maintain the state where the CD ratio is the second setting value; or if there are three or more contact points, the display control unit 30 goes forward to Step S206.

At Step S206, the display control unit 30 sets a third setting value to the CD ratio. For example, if being in a state where the CD ratio has been set to the first setting value or the second setting value, the display control unit 30 changes the CD ratio from the first setting value or the second setting value to the third setting value. Then, depending on the CD ratio set to the third setting value, the display control unit 30 moves the cursor on the screen of the display 20.

Note that the third setting value is less than the second setting value described above, and corresponds to, for example, a CD ratio with which the operator can move the cursor to be positioned on one of the selection items on the operational screen shown on the display 20 even if the size and interval of the selection item is very small. Also, if being in a state where the CD ratio has already been set to the third setting value, the CD ratio does not need to be reset. In this case, Step S206 means that the state is maintained where the CD ratio is the third setting value.

In this way, the information processing system 1 according to the present embodiment further differentiates the CD ratio between the case where there are two contact points on the operational surface of the touch pad 10, and the case where there are three or more. This makes it possible to change the CD ratio more finely, and hence, operability can be further improved when the cursor is moved.

Note that although the CD ratio is changed to be comparatively less if the contact points increase on the operational surface of the touch pad 10 in the present embodiment (for example, from one to two), it may be the other way around. Namely, the CD ratio is changed to be comparatively less if the contact points decrease on the operational surface of the touch pad 10 in the present embodiment (for example, from three or two to one). In this case, the operator performs a slide operation by having three fingers contact on the operational surface of the touch pad 10, and then, changes the number of contacting fingers to one or two, and continues the slide operation. This operation also makes it possible to quickly move the cursor 80, and to correctly position the cursor 80 at a desired position.

Also, the second setting value and the third setting value described above may be set appropriately considering the operability and the like. For example, the third setting value may be set to a value that corresponds to the second setting value in the first embodiment, the second setting value may be set to a value between the first setting value and the third setting value. By setting the CD ratio to the second setting value in this way, a cursor moving speed is implemented that is intermediate between the cursor moving speed corresponding to the first setting value, and the cursor moving speed corresponding to the third setting value (the second setting value in the first embodiment).

Third Embodiment

Next, a third embodiment will be described.

An information processing system 1 according to the present embodiment differs from that in the first embodiment in that when the number of contact points on the operational surface of the touch pad 10 is two, the CD ratio is differentiated depending on the relative position of a contact point with respect to another contact point that contacts first. In the following, the same elements as in the first embodiment are assigned the same numerical codes, and different parts will be mainly described.

Note that a configuration of the information processing system 1 according to the present embodiment can be represented by FIG. 1 as in the first embodiment, and its description is omitted.

Figure 9:
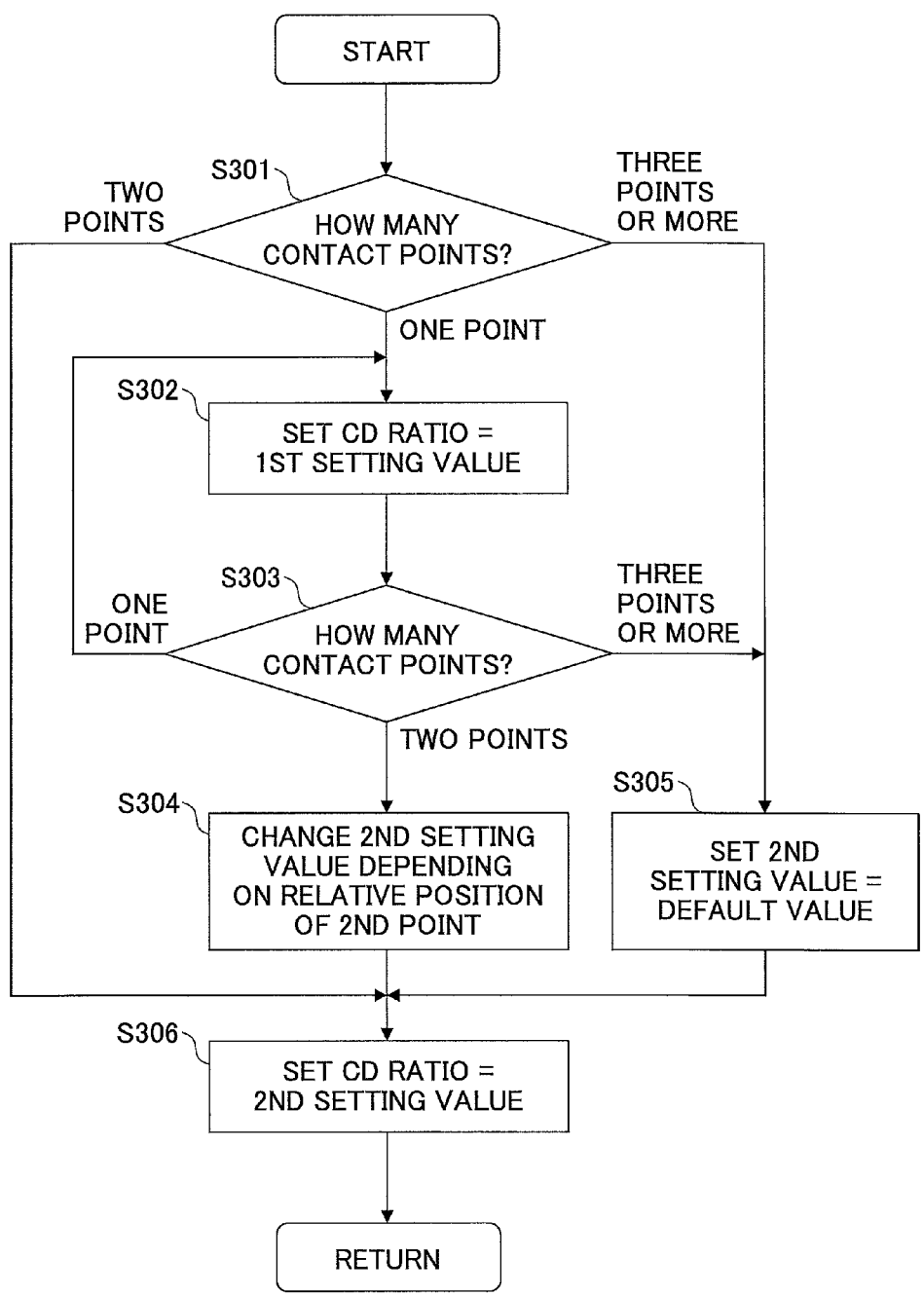
FIG. 9 is a flowchart that illustrates an example of a CD ratio switching process by an information processing system (display control unit) according to a third embodiment.

FIG. 9 is a flowchart that illustrates an example of a CD ratio switching process by the information processing system 1 (the display control unit 30) according to the present embodiment. The process is executed every time a contact point (an operational finger) is detected on the operational surface of the touch pad 10, and while the detection of the contact point continues (while the slide operation by the operator continues), Steps S301 to S306 are repeated as will be described later. Also, if no contact point is detected on the operational surface of the touch pad 10 while executing the process, the process ends. Also, at a start timing of the flowchart, the second setting value is set to a default value as will be described later.

At Step S301, the display control unit 30 determines how many contact points there are. If determining that there is only one contact point, the display control unit 30 goes forward to Step S302; if there are two contact points, the display control unit 30 goes forward to Step S306; or if there are three or more contact points, the display control unit 30 goes forward to Step S305.

At Step S302, the display control unit 30 sets a first setting value to the CD ratio. Then, depending on the CD ratio set to the first setting value, the display control unit 30 moves the cursor on the screen of the display 20.

Note that, similarly to the first embodiment, the first setting value corresponds to, for example, a CD ratio with which the cursor can be moved on the screen of the display 20 from the left end to the right end when a slide operation is performed from the left end to the right end on the operational surface of the touch pad 10. Also, if being in a state where the CD ratio has already been set to the first setting value, the CD ratio does not need to be reset. In this case, Step S302 means that the state is maintained where the CD ratio is the first setting value.

At Step S303, the display control unit 30 determines how many contact points there are. If there is only one contact point, the display control unit 30 goes back to Step S302 to maintain the state where the CD ratio is the first setting value; if there are two contact points, the display control unit 30 goes forward to Step S304; or if there are three or more contact points, the display control unit 30 goes forward to Step S305.

At Step S304, the display control unit 30 determines (changes) the second setting value depending on the relative position of a second point (a contact point that corresponds to an operational finger that subsequently contacts the operational surface of the touch pad 10) with respect to a first point (a contact point that corresponds to the other operational finger that first contacts the operational surface of the touch pad 10) among the contact points.

Note that Step S304 is executed only if the number of detected contact points changes from one to two, with an assumption that the relative positional relationship between the first point and the second point does not change much during a slide operation on the operational surface of the touch pad 10.

On the other hand, at Step S305, the display control unit 30 sets the second setting value to a default value.

Note that the default value is a value that corresponds to the second setting value in first embodiment. Also, if being in a state where the second setting value has already been set to the default value, the second setting value does not need to be reset. In this case, Step S305 means that the state is maintained where the second setting value is the default value.

At Step S306, the display control unit 30 sets the second setting value to the CD ratio. For example, if being in a state where the CD ratio has been set to the first setting value, the display control unit 30 changes the CD ratio from the first setting value to the second setting value. Then, depending on the CD ratio set to the second setting value, the display control unit 30 moves the cursor on the screen of the display 20.

Here, a method will be described that changes the second setting value set as the CD ratio, which corresponds to Step S305.

Figures 10A, 10B, 10C, 10D:
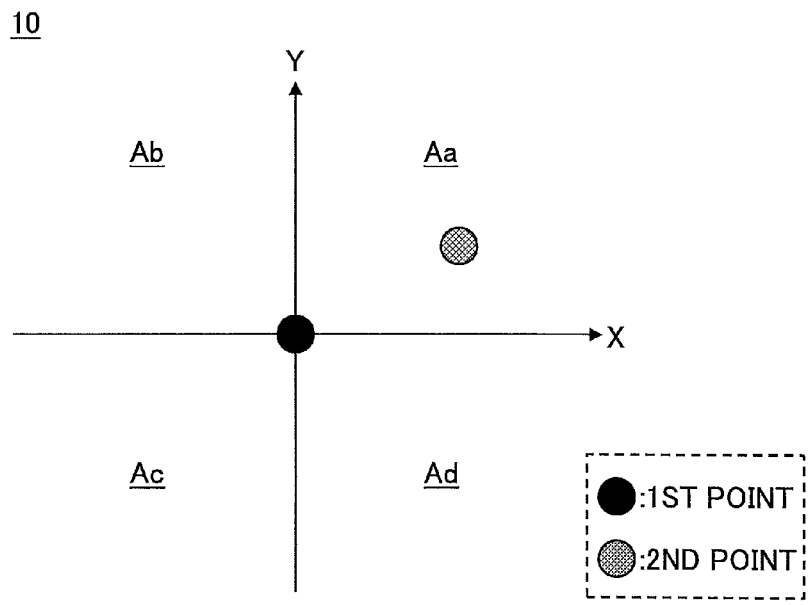
FIGS. 10A-10D are diagrams that illustrate an example of a method of changing a second setting value set as a CD ratio by an information processing system (display control unit) according to the third embodiment.

FIGS. 10A-10D are diagrams that illustrate an example of a method of changing the second setting value set as the CD ratio by the information processing system 1 according to the present embodiment (the display control unit 30). FIG. 10A is a diagram that illustrates a partition of areas that corresponds to relative positions of the second point with respect to the first point. FIG. 10B is a diagram that illustrates an example of a method of changing the second setting value, depending on the areas that are partitioned as illustrated in FIG. 10A. FIG. 10C is a diagram that illustrates another example of a method of changing the second setting value, depending on the areas that are partitioned as illustrated in FIG. 10A. FIG. 10D is a diagram that illustrates yet another example of a method of changing the second setting value, depending on the areas that are partitioned as illustrated in FIG. 10A.

As illustrated in FIG. 10A, the first point is set as the origin in the X-coordinate (a coordinate in the left and right direction) and the Y-coordinate (a coordinate in the up and down direction) on the operational surface of the touch pad 10, and areas will be referred to as an "area Aa" that corresponds to the first quadrant; an "area Ab" that corresponds to the second quadrant; an "area Ac" that corresponds to the third quadrant; and an "area Ad" that corresponds to the fourth quadrant. In examples illustrated in FIGS. 10B to 10D, the second setting value set as the CD ratio is changed, depending on which one of the areas Aa to Ad partitioned in this way includes the second point.

Note that "up", "down", "left", and "right" directions on the operational surface of the touch pad 10 are determined to be coincident with up, down, left, and right directions, respectively, on the screen of the display 20. Namely, a direction in which a slide operation is performed to move the cursor on the screen of the display 20 upward, downward, leftward, or rightward is determined as an up, down, left, or right direction on the operational surface of the touch pad 10. Also, if the second contact point is positioned on a boundary line between the areas Aa to Ad, the second contact point is assumed to be included in one of the areas Aa to Ad by a predetermined condition, to execute the process.

Referring to FIG. 10B, if the second point is included in the area Aa or the area Ab (the second point is positioned on the positive side (upper side) in the Y-coordinate with respect to the first point), the second setting value is set to a predetermined value Vab. Also, if the second point is included in the area Ac or area Ad (the second point is positioned on the negative side (lower side) in the Y-coordinate with respect to the first point), the second setting value is set to a predetermined value Vcd. Namely, the second setting value as the CD ratio in this example is differentiated for a case where the second point is positioned upward with respect to the first point, and for a case where the second point is positioned downward.

Note that the predetermined values Vab and Vcd may be appropriately set considering operability and the like. For example, one of them may be set equivalent to the default value, and the other may be set less so that the cursor can be precisely positioned on a selection item. Alternatively, the other may be set greater to implement a cursor moving speed that is intermediate between the cursor moving speed corresponding to the first setting value, and the cursor moving speed corresponding to the third setting value (the second setting value in the first embodiment).

Also, referring to FIG. 10C, if the second point is included in the area Aa or the area Ad (the second point is positioned on the positive side (right side) in the X-coordinate with respect to the first point), the second setting value is set to a predetermined value Vad. Also, if the second point is included in the area Ab or area Ac (the second point is positioned on the negative side (left side) in the X-coordinate with respect to the first point), the second setting value is set to a predetermined value Vbc, which is different from the predetermined value Vad. Namely, the second setting value as the CD ratio in this example is differentiated for a case where the second point is positioned leftward with respect to the first point, and for a case where the second point is positioned rightward.

Note that the predetermined values Vad and Vbc may be appropriately set considering operability and the like, similarly to the example illustrated in FIG. 10B.

Also, referring to FIG. 10D, if the second point is included in the area Aa (the second point is positioned upward and rightward with respect to the first point), the second setting value is set to a predetermined value Va. Also, if the second point is included in the area Ab (the second point is positioned upward and leftward with respect to the first point), the second setting value is set to a predetermined value Vb. Also, if the second point is included in the area Ac (the second point is positioned downward and leftward with respect to the first point), the second setting value is set to a predetermined value Vc, which is different from the predetermined values Va and Vb. Also, if the second point is included in the area Ad (the second point is positioned downward and rightward with respect to the first point), the second setting value is set to a predetermined value Vd, which is different from the predetermined values Va, Vb and Vc. Namely, the second setting value as the CD ratio in this example is differentiated depending on whether the second point is positioned upward or downward, and whether positioned leftward or rightward, with respect to the first point.

Note that the predetermined values Va to Vd may be appropriately set considering operability and the like, similarly to the examples illustrated in FIGS. 10B and 10C.

In this way, the information processing system 1 according to the present embodiment changes the second setting value set as the CD ratio depending on the relative position of a second contact point with respect to a first contact point when the number of contact points on the operational surface of the touch pad 10 is two. Namely, the CD ratio is differentiated depending on the relative position of a second contact point with respect to a first contact point. This makes it possible to change the CD ratio more finely, and hence, operability can be further improved when the cursor is moved.

Also, in the examples illustrated in FIGS. 10B to 10D, the second setting value as the CD ratio is differentiated depending on whether the second point is positioned upward or downward, and/or whether positioned leftward or rightward, with respect to the first point. This can makes the processing load (calculation load) of the information processing system 1 (the display control unit 30) comparatively lower in a case where the CD ratio is changed. Namely, the display control unit 30 just needs to determine the magnitude relationship of the first point and the second point in terms of the X-coordinate that are represented in the left and right direction, and/or in terms of the Y-coordinate that are represented in the up and down direction. Therefore, the process load (calculation load) can be suppressed comparatively lower.

Furthermore, as in the example illustrated in FIG. 10C, by differentiating the CD ratio for a case where the second point is positioned rightward with respect to the first point, and for a case where the second point is positioned leftward, it is possible to correctly change the CD ratio so that it is suitable for kinds of fingers (for example, the index finger, the middle finger, etc.) that the operator uses. Namely, considering the range of motion of a wrist of a person, it is impossible that left and right positions of fingers of the operator are switched on the operational surface of the touch pad 10. For example, assuming that a slide operation is performed with the index finger and the middle finger of the right hand, if the second point is on the right side with respect to the first point, the finger that corresponds to the second point is the middle finger; or if the second point is on the left side, the finger that corresponds to the second point is the index finger. Therefore, the information processing system 1 can correctly set (the second setting value set as) the CD ratio that matches with fingers of the operator, and hence, operability can be further improved when the cursor is moved.

Fourth Embodiment

Next, a fourth embodiment will be described.

An information processing system 1 according to the present embodiment differs from that in the first embodiment in that the CD ratio is differentiated when the number of contact points on the operational surface of the touch pad 10 is two, depending on the distance between the two points. In the following, the same elements as in the first embodiment are assigned the same numerical codes, and different parts will be mainly described.

Note that a configuration of the information processing system 1 according to the present embodiment can be represented by FIG. 1 as in the first embodiment, and its description is omitted.

Figure 11:
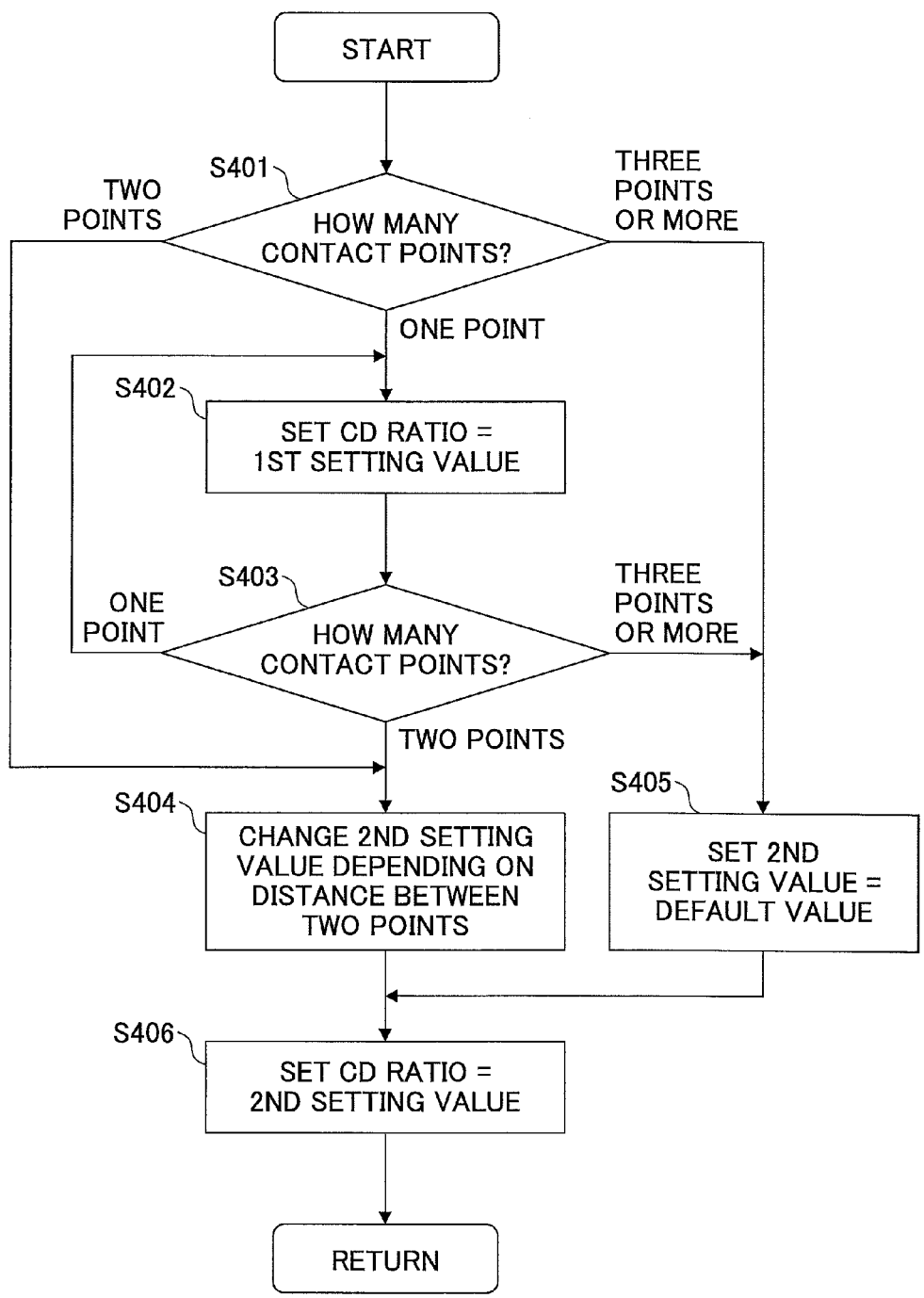
FIG. 11 is a flowchart that illustrates an example of a CD ratio switching process by an information processing system (display control unit) according to a fourth embodiment.

FIG. 11 is a flowchart that illustrates an example of a CD ratio switching process by the information processing system 1 (the display control unit 30) according to the present embodiment. The process is executed every time a contact point (an operational finger) is detected on the operational surface of the touch pad 10, and while the detection of the contact point continues (while the slide operation by the operator continues), Steps S401 to S406 are repeated as will be described later. Also, if no contact point is detected on the operational surface of the touch pad 10 while executing the process, the process ends.

At Step S401, the display control unit 30 determines how many contact points there are. If determining that there is only one contact point, the display control unit 30 goes forward to Step S402; if there are two contact points, the display control unit 30 goes forward to Step S404; or if there are three or more contact points, the display control unit 30 goes forward to Step S405.

At Step S402, the display control unit 30 sets a first setting value to the CD ratio. Then, depending on the CD ratio set to the first setting value, the display control unit 30 moves the cursor on the screen of the display 20.

Note that, similarly to the first embodiment, the first setting value corresponds to, for example, a CD ratio with which the cursor can be moved on the screen of the display 20 from the left end to the right end when a slide operation is performed from the left end to the right end on the operational surface of the touch pad 10. Also, if being in a state where the CD ratio has already been set to the first setting value, the CD ratio does not need to be reset. In this case, Step S402 means that the state is maintained where the CD ratio is the first setting value.

At Step S403, the display control unit 30 determines how many contact points there are. If there is only one contact point, the display control unit 30 goes back to Step S402 to maintain the state where the CD ratio is the first setting value; if there are two contact points, the display control unit 30 goes forward to Step S404; or if there are three or more contact points, the display control unit 30 goes forward to Step S405.

At Step S404, the display control unit 30 determines (changes) the second setting value depending on the distance between the contact points (between the two points).

On the other hand, at Step S405, the display control unit 30 sets the second setting value to a default value.

Note that, similarly to the third embodiment, the default value is a value that corresponds to the second setting value in the first embodiment. Also, if being in a state where the second setting value has already been set to the default value, the second setting value does not need to be reset. In this case, Step S405 means that the state is maintained where the second setting value is the default value.

At Step S406, the display control unit 30 sets the second setting value to the CD ratio. For example, if being in a state where the CD ratio has been set to the first setting value, the display control unit 30 changes the CD ratio from the first setting value to the second setting value. Then, depending on the CD ratio set to the second setting value, the display control unit 30 moves the cursor on the screen of the display 20.

Here, a method will be described that changes the second setting value set as the CD ratio, which corresponds to Step S405.

Figures 12, 13:
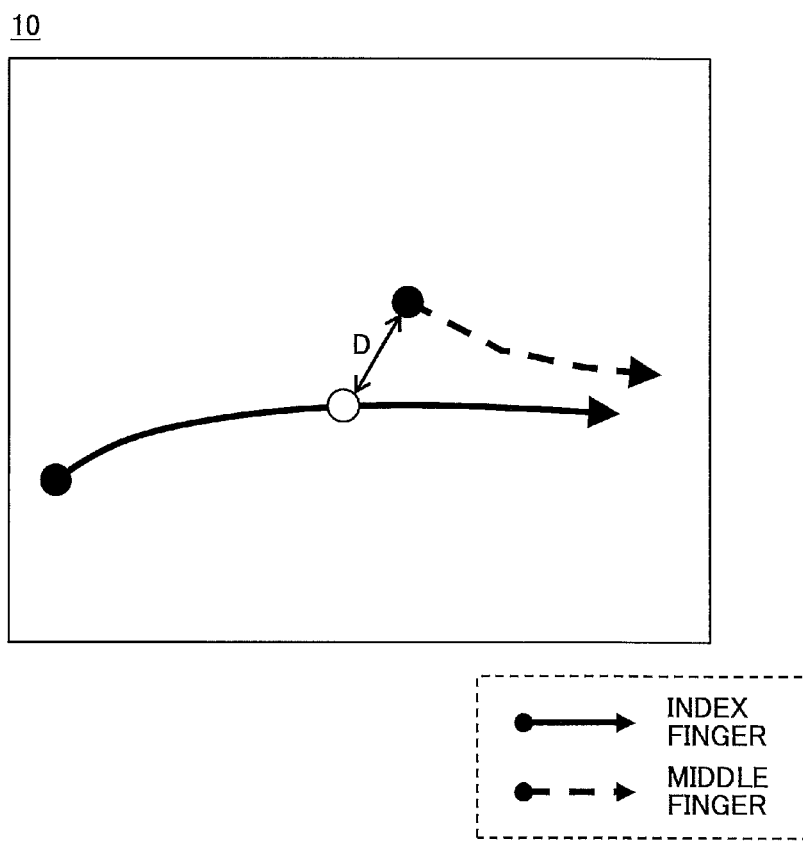
FIG. 12 is a diagram that illustrates an example of a method of changing a second setting value set as a CD ratio by an information processing system (display control unit) according to the fourth embodiment.
FIG. 13 is a diagram that illustrates operations of an information processing system according to the fourth embodiment.

FIG. 12 is a diagram that illustrates an example of a method of changing the second setting value set as the CD ratio by the information processing system 1 (the display control unit 30) according to the present embodiment.

Note that predetermined distances L1 to L3 satisfy a relationship L1>L2>L3>0, and predetermined values V1 to V4 satisfy a relationship V1>V2>V3>V4>0.

Referring to FIG. 12, if the distance D between contact points is greater than the predetermined distance L1, the second setting value is determined to be the predetermined value V1. If the distance D between the contact points is less than or equal to the predetermined distance L1, and is greater than the predetermined distance L2, the second setting value is determined to be the predetermined value V2. If the distance D between the contact points is less than or equal to the predetermined distance L2, and is greater than the predetermined distance L3, the second setting value is determined to be the predetermined value V3. If the distance D between the contact points is less than or equal to the predetermined distance L3, the second setting value is determined to be the predetermined value V4.

In this way, the information processing system 1 according to the present embodiment changes the second setting value set as the CD ratio when the number of contact points is two, depending on the distance D between the two points. Namely, when the number of contact points is two, the information processing system 1 differentiates the CD ratio depending on the distance D between two points. Specifically, the information processing system 1 sets the CD ratio less when the distance D between two points is shorter.

Next, using FIG. 13, a situation will be described where the CD ratio change process by the information processing system 1 (the display control unit 30) illustrated in FIG. 11, functions effectively.

FIG. 13 is a diagram that illustrates operations of the information processing system 1 according to the present embodiment. Specifically, it is a diagram that illustrates an example of a slide operation performed by an operator on the operational screen illustrated in FIG. 7A described above where the operator has had "A" input as a character, and then, inputs "P" as another character.

Assume that the operator operates the operational surface of the touch pad 10 by the right hand.

As illustrated in FIG. 13, the operator starts performing a slide operation by the index finger from the left end part to the right end part on the operational surface of the touch pad 10. Then, at a timing when the cursor 80 gets closer to a certain extent to the right end on the operational surface of the touch pad 10, the operator has the middle finger contact the operational surface of the touch pad 10, and continues the slide operation while making the distance D gradually narrower between the contact points that correspond to the index finger and the middle finger, respectively. Thus, the amount of movement can be adjusted appropriately for positioning the cursor on a selection item ("P" in FIG. 7A) on the operational screen on the display 20. Therefore, operability can be further improved when the cursor is moved.

The embodiments of the present invention have been described in detail. Note that the present invention is not limited to the above specific embodiments, but various changes, substitutions, and alterations could be made without departing from the spirit and scope of the present invention.

For example, in the embodiments described above, although the CD ratio is set (for example, the first setting value or the second setting value) depending on the number of contact points (for example, one, or greater than or equal to two), the CD ratio may be set depending on an increase or a decrease of the number of reference points where the number of reference points is the number of contact points when it has been transitioned into a state in which a contact point (s) is detected on the operational surface of the touch pad 10. Specifically, the CD ratio may be set to be the first setting value with the number of reference points, and if the number of contact points increases by one or more from the number of the reference points, the CD ratio may be set to be the second setting value. In other words, the information processing system 1 may change the CD ratio depending on a change of the number of contact points in a state where a contact point (s) is detected on the operational surface of the touch pad 10.

Also, in the embodiments described above, although the information processing system 1 is explained as an example in which the touch pad, the display 20 as a display unit, and the display control unit 30 as a processing unit are separately disposed, the technologies relating to the information processing system 1 may be implemented by an information processing apparatus that includes functions of a touch pad, a display unit, and a processing unit.

Also, in the embodiments described above, although the touch pad, the display unit, and the processing unit are included in the vehicle, the function of the processing unit may be provided, for example, in an information center at a remote location, with which the display unit and the touch pad are connected so that a communication can be made via a known wireless communication network.

Also, in the embodiments described above, although the information processing system 1 is used for an operational apparatus for a vehicle whose operational screen is operated with a touch pad, the information processing system may be used for an arbitrary operational apparatus for any machine other than a vehicle, whose screen is operated with a touch pad. For example, the technologies relating to the information processing system 1 in the embodiments described above may be used for a touch pad, a display, a note-type PC that includes a CPU, and the like.

The present application is based on and claims the benefit of priority of Japanese Priority Application No. 2014-245206, filed on Dec. 3, 2014, the entire contents of which are hereby incorporated by reference.

The invention claimed is:

1. An information processing system, comprising:
a display; and
a processor configured to:

detect finger contact points on a touch pad for a period of time; and while detecting finger contact points on the touch pad for the period of time:

when the number of detected finger contact points is one: (i) set or maintain a Control-Display (CD) ratio, which is the amount of movement of a cursor on the display with respect to an amount of movement of the one detected finger contact point on the touch pad, to a first setting value, and (ii) cause the cursor to move on the display with movement of the one detected finger contact point, which is a first finger contact point, based on the CD ratio set to the first setting value; and when the number of detected finger contact points on the touch pad is two: (i) determine, based on the first detected finger contact point being an origin of an x-y axis, whether the other one of the two detected finger contact points, which is a second detected finger contact point, that is not the first detected finger contact point, is located in the first, second, third or fourth quadrants of the x-y axis, (ii) set or maintain, based on the determination regarding which of the four quadrants the detected second finger contact point is located in, the CD ratio to a second setting value, and (iii) cause the cursor to move on the display with the movement of the first detected finger contact point based on the CD ratio set to the second setting value.

2. The information processing system of claim 1, wherein the processor is further configured to: differentiate the amount of movement of the cursor with respect to the amount of movement of the first detected contact point based on a third setting value, for a case where the number of contact points on the touch pad is three or more.

3. The information processing system of claim 1, wherein the processor is further configured to: differentiate the amount of movement of the cursor with respect to the amount of movement of the first detected contact point such that the amount of movement of the cursor, for a case where the second detected finger contact point is located in the first or fourth quadrants is different from the amount of movement for a case where the second finger contact point is located in the second or third quadrants.

4. The information processing system of claim 1, wherein the processor is further configured to: differentiate the amount of movement of the cursor with respect to the amount of movement of the first detected contact point such that the amount of movement of the cursor for a case where the second detected finger contact point is located in the first or second quadrants is different from the amount of movement for a case where the second finger contact point is located in the third or fourth quadrants.

5. The information processing system of claim 1, wherein the processor is further configured to: differentiate the amount of movement of the cursor with respect to the amount of movement of the first detected contact point, when the number of contact points on the touch pad is two, depending on a distance between the two contact points.

6. An information processing apparatus, comprising:
a touch pad;
a display; and
a processor configured to:
detect finger contact points on the touch pad for a period of time; and
while detecting finger contact points on the touch pad for the period of time:

when the number of detected finger contact points is one: (i) set or maintain a Control-Display (CD) ratio, which is the amount of movement of a cursor on the display with respect to an amount of movement of the one detected finger contact point on the touch pad, to a first setting value, and (ii) cause the cursor to move on the display with movement of the one detected finger contact point, which is a first finger contact point, based on the CD ratio set to the first setting value; and when the number of detected finger contact points on the touch pad is two: (i) determine, based on the first detected finger contact point being an origin of an x-y axis, whether the other one of the two detected finger contact points, which is a second detected finger contact point, that is not the first detected finger contact point, is located in the first, second, third or fourth quadrants of the x-y axis, (ii) set or maintain, based on the determination regarding which of the four quadrants the detected second finger contact point is located in, the CD ratio to a second setting value, and (iii) cause the cursor to move on the display with the movement of the first detected finger contact point based on the CD ratio set to the second setting value.

7. An information processing method, the method comprising:
detecting finger contact points on the touch pad for a period of time; and
while detecting finger contact points for the period of time:

when the number of detected finger contact points is one: (i) setting or maintaining a Control-Display (CD) ratio, which is the amount of movement of a cursor on the display with respect to an amount of movement of the one detected finger contact point on the touch pad, to a first setting value, and (ii) causing the cursor to move on the display with movement of the one detected finger contact point, which is a first finger contact point, based on the CD ratio set to the first setting value; and when the number of detected finger contact points on the touch pad is two: (i) determining, based on the first detected finger contact point being an origin of an x-y axis, whether the other one of the two detected finger contact points, which is a second detected finger contact point, that is not the first detected finger contact point, is located in the first, second, third or fourth quadrants of the x-y axis, (ii) setting or maintaining, based on the determination regarding which of the four quadrants the detected second finger contact point is located in, the CD ratio to a second setting value, and (iii) causing the cursor to move on the display with the movement of the first detected finger contact point based on the CD ratio set to the second setting value.

8. The information processing apparatus of claim 6, wherein the display is separate from the touch pad and is placed at a remote position from the touch pad.

9. The information processing system of claim 1, wherein the display is positioned in the field of vision of a driver of a vehicle, when driving the vehicle.

10. The information processing apparatus of claim 6, wherein the processor is further configured to: cause the display to move the cursor by scrolling on a navigational map screen on the display based on the CD ratio set to the second setting value.

11. The information processing apparatus of claim 6, wherein
    the touch pad includes a switch or sensor below an upper surface of the touch pad, and
    in a state where the cursor is moved on a selection region of the display, and a pressing operation has been detected via the switch or sensor, execute a function of the selection region.

12. The information processing system of claim 1, wherein the second setting value is greater than the first setting value so as to implement a cursor moving speed for the second setting value that is greater than a cursor moving speed for the first setting value.

\* \* \* \* \*